(12) United States Patent
Kobayashi

(10) Patent No.: US 6,256,140 B1
(45) Date of Patent: Jul. 3, 2001

(54) OPTICAL AMPLIFYING APPARATUS FOR TRANSMITTING WAVELENGTH DIVISION MULTIPLEXED SIGNAL LIGHT AND OPTICAL NETWORK APPARATUS WITH USING THE SAME

(75) Inventor: Ippei Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/427,089

(22) Filed: Oct. 26, 1999

(30) Foreign Application Priority Data

Oct. 27, 1998 (JP) .................................................. 10-304814

(51) Int. Cl.⁷ ...................................................... H01S 3/00
(52) U.S. Cl. ........................................... 359/341; 359/124
(58) Field of Search ..................................... 359/341, 124

(56) References Cited

U.S. PATENT DOCUMENTS 6,078,422 * 6/2000 Kosaka et al. ...................... 359/341

OTHER PUBLICATIONS

Zyskind, et al., "Fast Link Control Protection for Surviving Channels in Multiwavelength Optical Networks", 22nd European Conference on Optical Communication, Oslo, Norway, 1996, pp. 49–52.

Mecozzi, et al., "Theory of Optical Amplifier Chains", Journal of Lightwave Technology, vol. 16, No. 5, May 1998, pp. 745–756.

Luo, et al., "Experimental and Theoretical Analysis of Relaxation–Oscillations and Spectral Hold burning Effects in All–Optical Gain–Clamped EDFA's for WDM Networks", Journal of Lightwave Technlogy, vol. 16, No. 4, Apr. 1998, pp. 527–533.

* cited by examiner

Primary Examiner—Mark Hellner
(74) Attorney, Agent, or Firm—McGinn & Gibb, PLLC

(57) ABSTRACT

An optical amplifying apparatus is basically arranged by employing an amplifying optical fiber, a pumping light source, and a wavelength division multiplexer for entering thereinto pumping light. This optical amplifying apparatus is further arranged by employing an amplified signal light reentering unit for branching a portion of amplified signal light and for reentering the branched/amplified signal light into an amplifying optical fiber from an output side thereof along a backward direction; an amplified signal light level control circuit for controlling a level in such a manner that a total output level becomes a predetermined value, and this total output level is obtained by adding an output level of the amplified signal light to an output level of the amplified signal light which has been reentered into the amplifying optical fiber to be optically amplified; and also a gain control circuit for detecting an input level of signal light and an input level of branched/amplified signal light before being reentered into the amplifying optical fiber and output level of the amplified signal light and an output level of branched/amplified signal light after being reentered into the amplifying optical fiber, and also for controlling a gain in such a manner that this gain is maintained to a preselected value. Even when a total number of channels is changed in the wavelength division multiplexing transmission, levels of the respective channels are kept constant. Even during transition response, there is no level change in the signal light.

22 Claims, 9 Drawing Sheets

Fig.3 PRIOR ART
(A) IN THE CASE THAT 8 CHANNELS ARE
OPERATED(ALL 8 CHANNELS)
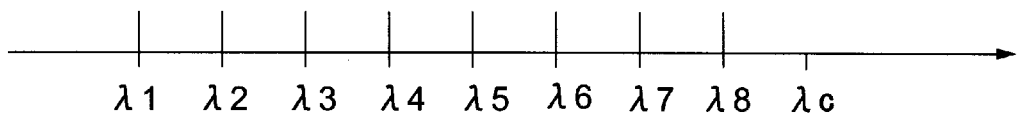
(B) IN THE CASE THAT 1 CHANNEL IS
OPERATED(ALL 8 CHANNELS)
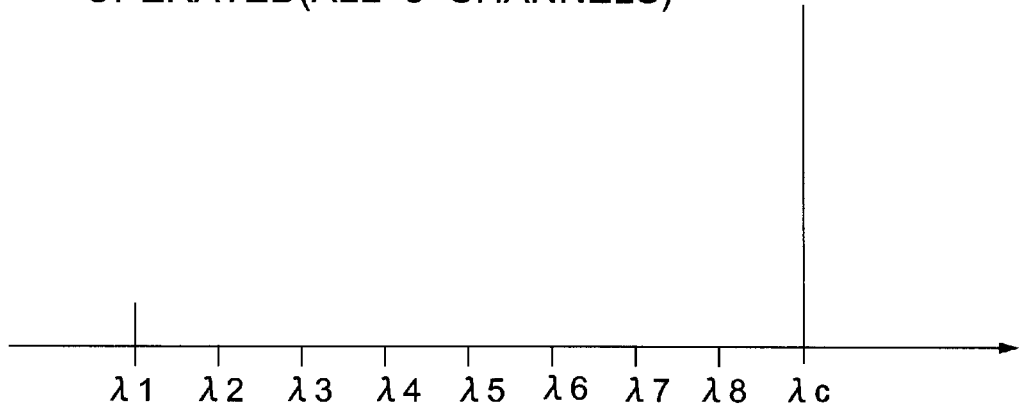

OPTICAL AMPLIFYING APPARATUS FOR TRANSMITTING WAVELENGTH DIVISION MULTIPLEXED SIGNAL LIGHT AND OPTICAL NETWORK APPARATUS WITH USING THE SAME

BACKGROUND OF THE INVENTION

1. Field of the Invention

The present invention is related to an optical amplifying apparatus for optically amplifying wavelength division multiplexed signal light produced by that a plurality of signal light having different wavelengths from each other is multiplexed in a wavelength division multiplexing manner, and also is related to an optical network apparatus with employment of this optical amplifying apparatus.

2. Description of the Related Art

The wavelength division multiplex transmission technique is such a technique required to increase a transmission capacity. The wavelength division multiplex transmission is suitable to increase the transmission capacity, but also to construct an optical network capable of switching route setting operations every wavelength channel. An optical network corresponds to such a network that while each of wavelengths is handled as a channel, an apparatus called as an optical ADM (optical add drop multiplexer) is employed, so that signal light is inserted into a transmission path every wavelength channel, or is branched from the transmission path.

However, in such an optical network, a wavelength channel is inserted, or branched, otherwise the number of optical transmitter module for transmitting a signal is changed in each of modes. As a result, a total channel number of signal light in the transmission path may be possibly changed. When the total channel number of the signal light transmitted in the transmission path, a level of channels which are continuously transmitted is varied. As a result, there are such problems that the transmission characteristic is deteriorated, or optical surge is produced.

The deterioration of the transmission characteristic caused by the change in the channel number becomes remarkable when a total number of wavelengths to be division-multiplexed, namely a total number of signal light is increased. In a prospective wavelength division multiplexed signal light transmission, when multichannel trend is progressed, the above-described problem will become more serious.

In this case, the generation process of the above problem in the optical network will be simply explained.

Generally speaking, as a basic control method for an optical amplifier, there are two control methods, namely a control method in which pumping light outputted from a pumping light source of an optical amplifier is controlled by way of the ALC (automatic level control) system so as to make the pumping light constant, and another control method in which pumping light outputted from a pumping light source is controlled by way of an AGC (automatic gain control) system so as to make a gain constant.

A first description is made of such a case that the gain of the optical amplifier is controlled by using the ALC system. When a total channel number of signal light to be transmitted is changed, the gain of the optical amplifier is controlled in such a manner that the output of this optical amplifier becomes constant by the ALC system. Otherwise, the gain of this optical amplifier is clamped to the maximum gain value. However, in any one of these cases, the output per 1 channel is changed.

Accordingly, in order to suppress such a change in the total channel number when the gain is controlled in the ALC control system, there is another control arrangement that the information about the total channel number is supplied as the monitor signal to the optical amplifier so as to control the gain. However, in this control system, since the gain is not controlled in synchronism with the change in total channel number, there is another problem that the level produced immediately after the total channel number is change cannot be compensated.

"Theory of Optical Amplifier Chains" Journal of Lightwave Technology, Vol. 16, No. 5, May 1998 (prior art publication 1) describes the transition response of the output from the optical amplifier in such a system that the optical amplifiers are relayed in the multi-stage manner and are controlled by way of only the ALC control system when the input levels of the optical amplifiers are changed. In this prior art publication 1, when the total channel number is changed in the transmission system that the optical amplifiers are relayed in the multi-stage manner, the transmission characteristic of the channel having the wavelength "λ1" corresponding to the existing channel is considerably deteriorated.

Also, in such a case that a gain of an optical amplifier is controlled by employing the AGC control system, a level of a remaining channel is varied when a total channel number is changed. This channel level change is described in, for example, "Experimental and Theoretical Analysis of Relaxation-Oscillations and Spectral Hole Burning Effects in All-Optical Gain-Clamped EDFA's for WDM Networks", Journal of Lightwave Technology, Vol. 16, No. 4, April 1998 (prior art publication 2).

"Fast Link Control Protection For Surviving Channels in Multiwavelength Optical Networks" in Proc. 22nd European Conference Optical Communication, ECOC'96, Oslo, Norway, 1996, postdeadline paper ThC. 3.6 (prior art publication 3) discloses the following arrangement functioning as the technique capable of suppressing the level change in the existing channel when the total channel number is changed. That is, the output compensating channel having the different wavelength from that of the transmission signal channel is provided at the output of each node, so that the output from the node is kept constant.

However, the above-described prior art technique owns the below-mentioned problem. That is, first of all, in the transmission path of the optical network, in order to compensate for the level change in the existing channel when the total channel number is changed, if the adjusting signal light is provided with employment of such a new wavelength band, then there is a problem that the limited wavelength band of the optical amplifier is further limited.

As a second problem, in order to compensate for the level change in the existing channel in the transmission path, if the signal light having the different wavelength from that of the transmission channel is employed, it is required to employ an LD (laser diode) capable of stabilizing the levels of the respective channels.

SUMMARY OF THE INVENTION

A primary object of the present invention is to provide an optical amplifying apparatus for transmitting wavelength division multiplexed signal light, capable of keeping a level of each channel constat even when a total number of transmission channels is changed in the wavelength division signal light transmission.

A secondary object of the present invention is to provide an optical amplifying apparatus for transmitting wavelength division multiplexed signal light, capable of inducing a level variation of signal light in a channel which continuously transmits the signal light even when a transition response occurs. For example, even when the operation channel number is changed from 0 channel to more than 1 channel, no optical surge occurs.

To solve the above-explained problems, an optical amplifying apparatus for transmitting wavelength division signal light, according to the present invention, is arranged by, as a basic arrangement, an input terminal into which signal light is entered and the input signal light is made from single signal light, or signal light, the plural different wavelengths of which are division-multiplexed is entered; an amplifying optical fiber; a pumping light source for outputting pumping light; and also a wavelength division multiplexer for causing the pumping light to be entered into the amplifying optical fiber, in which the signal light is optically amplified to output amplified signal light from the optical amplifying apparatus.

In addition to the above-explained arrangement, the optical amplifying apparatus according to the present invention is further comprised of an amplified signal light reentering input unit, a branched/amplified signal light level control circuit, an amplifying optical fiber input power detecting circuit, an amplifying optical fiber output power detecting circuit, and a gain control circuit. The amplified signal light reentering unit branches a portion of the amplified signal light and reenters the branched/amplified signal light into the amplifying optical fiber from an output side thereof along a backward direction. The branched/amplified signal light level control circuit controls the level of the branched/amplified signal light in such a manner that a total output level becomes a predetermined value, and the total output level is obtained by adding an output level of the amplified signal light to an output level of the branched/amplified signal light which has been reentered into the amplifying optical fiber to be optically amplified.

The amplifying optical fiber input power detecting circuit detects an input level of the signal light and an input level of the branched/amplified signal light before being reentered into the amplifying optical fiber to thereby output an amplifying optical fiber input level. The amplifying optical fiber output power detecting circuit detects an output level of the amplified signal light and an output level of the branched/amplified signal light after being reentered into the amplifying optical fiber to be optically amplified. The gain control circuit controls a gain based upon the amplifying optical fiber input level and the amplifying optical fiber output level in such a manner that the gain is maintained at a preselected value. The above-described gain control operation is carried out by controlling an injection current injected into a pumping light source.

The amplified signal light reentering unit is arranged by a first optical branching device for branching a portion of the amplified signal light to output the branched/amplified signal light; a variable attenuator for controlling an attenuation amount of the branched/amplified signal light by receiving an attenuation amount control signal; and a reflector for reflecting the branched/amplified signal light which passes through the variable attenuator.

Alternatively, the amplified signal light reentering unit may be arranged by a first optical branching device for branching a portion of the amplified signal light to output the branched/amplified signal light; and a variable reflector for controlling reflectivity of the branched/amplified signal light by receiving an attenuation amount control signal so as to reflect the branched/amplified signal light.

Also, the amplified signal light reentering unit may be arranged by a first optical branching device for setting a branching ratio used to branch a portion of the amplified signal light by receiving an attenuation amount control signal to output the branched/amplified signal light; and a reflector for reflecting the branched/amplified signal light.

Furthermore, the amplified signal light reentering unit is arranged by a first optical branching device for branching a portion of the amplified signal light to output the branched/amplified signal light; a variable attenuator for entering thereinto the one portion of branched/amplified signal light and for controlling an attenuation amount of the branched/amplified signal light by receiving an attenuation amount control signal; and a first optical circulator. This optical circulator owns a function for entering the branched/amplified signal light which passes through the variable attenuator into the amplifying optical fiber and also for outputting the amplified signal light to a transmission path.

The branched/amplified signal light level control unit includes an attenuation amount control circuit for sending out the attenuation amount control signal in such a manner that a synthesized output level is made equal to a predetermined value, and the synthesized output level is produced by synthesizing an output level of the amplified signal light with an output level of the branched/amplified signal light after being reentered into the amplifying optical fiber so as to be optically amplified.

The amplifying optical fiber input power detecting unit is constituted by a second optical branching device arranged on the input side of the amplifying optical fiber, for branching a portion of the signal light; a third optical branching device arranged between the output side of the amplifying optical fiber and the amplified signal light reentering means, for branching a portion of the branched/amplified signal light which is traveled toward the amplifying optical fiber; and a first optical coupler for coupling the signal light branched by the second optical branching device to the signal light branched by the third optical branching device. It should be understood that instead of the above-explained third optical branching device, a first optical circulator may be arranged. This first optical circulator outputs the amplified signal light derived from the amplifying optical fiber toward the transmission path, and also outputs to the first optical coupler, a portion of the branched/amplified signal light which is traveled to the amplifying optical fiber.

The amplifying optical fiber input power detecting unit is arranged by a fourth optical branching device arranged on the output side of the amplifying optical fiber, for branching a portion of the amplified signal light; a fifth optical branching device arranged on the input side of the amplifying optical fiber, for branching a portion of the branched/amplified signal light which is reentered into the amplifying optical fiber and is optically amplified; and a second optical coupler for coupling the signal light branched by the fourth optical branching device to the signal light branched by the fifth optical branching device. Instead of the fifth optical branching device, a second optical circulator may be arranged, and this second optical circulator outputs the signal light to the amplifying optical fiber and also outputs the branched/amplified signal light outputted from the amplifying optical fiber to the second optical coupler; and a second optical coupler for coupling the signal light branched by the fourth optical branching device to the signal light branched by the fifth optical branching device.

With employment of the above-explained arrangement, the optical amplifying apparatus for transmitting the wavelength division multiplexed signal light, according to the present invention, is featured in that assuming now that a level of the signal light inputted into the amplifying optical fiber is $P_{in1}$; a level of the amplified signal light outputted from the amplified optical fiber is $P_{out1}$; a level of the branched/amplified signal light entered into the amplified optical fiber is $P_{in2}$; and a level of the branched/amplified signal light outputted from the amplifying optical fiber is $P_{out2}$, the level $P_{in1}$ of the signal light branched by the second optical branching device; the level $P_{in2}$ of the branched/amplified signal light branched by the third optical branching device; the level $P_{out1}$ of the amplified signal light branched by the fourth optical branching device; and the level $P_{out2}$ of the branched/amplified signal light branched by the fifth optical branching device each satisfy the following condition:

$$P_{in1}:P_{in2}:P_{out1}:P_{out2}=P_{in1mon}:P_{in2mon}: P_{out1mon}:P_{out2mon}$$

In addition to the above-explained arrangement, the optical amplifying apparatus for transmitting the wavelength division signal light, according to the present invention, is further arranged by a first optical isolator arranged at a pre-stage of the amplifying optical fiber, for causing such signal light to pass therethrough only along a travel direction of the signal light and for blocking such signal light traveled along a direction opposite to the travel direction; and a second optical isolator arranged at a post-stage of the amplifying optical fiber output power detecting means, for causing such signal light to pass therethrough only along a travel direction of the signal light and for blocking such signal light traveled along a direction opposite to the travel direction.

The first wavelength division multiplexer may be arranged at a pre-stage of the amplifying optical fiber, as a forward pumping type multiplexer. The first wavelength division multiplexer may be arranged at a post-stage of the amplifying optical fiber, as a backward pumping type multiplexer. Furthermore, the first wavelength division multiplexer may be further comprised of a second pumping light source for outputting second pumping light, as a bidirectional pumping type multiplexer.

An optical network apparatus, according to the present invention, is arranged by a plurality of optical transmitters for outputting signal light having different wavelengths from each other; a wavelength division multiplexing circuit for wavelength-division-multiplexing each of the signal light to output wavelength-division-multiplexed signal light; and an optical ADM for selecting a wavelength from the wavelength-division-multiplexed light to thereby extract specific signal light and also for inserting signal light. The above-explained optical amplifying apparatus for transmitting the wavelength division multiplexed signal light may be applied to an optical amplifying apparatus.

BRIEF DESCRIPTION OF THE DRAWINGS

The above and other objects, features and advantages of the present invention will become more apparent from the following detailed description when taken in conjunction with the accompanying drawings wherein:

FIG. 1(A) shows a level change condition of an input signal, and FIG. 1(B) shows a level change condition of an output signal after the input signal is relayed through a large number of optical amplifiers;

FIG. 3 represents an example of the spectrum of the signal light in the conventional wavelength division multiplexed signal light transmitting apparatus, i.e., FIG. 3(A) shows such a condition that while all of 8 channels (λ1 to λ8) of signal light to be transmitted are operated, an output compensating channel (λc) is not operated; and FIG. 3(B) indicates such a condition that while only one channel for the signal light to be transmitted is available, the output compensating channel (λc) is operated;

FIG. 6A-1 shows a channel level change in an input $P_{in1}$ along EDF forward direction; FIG. 6A-2 shows a channel level change in an input $P_{in2}$ along EDF backward direction; FIG. 6B-1 indicates an output (output of optical amplifier) $P_{out1}$ along EDF forward direction; FIG. 6B-2 indicates an output $P_{out2}$ along EDF backward direction; and FIG. 6B-3 indicates an output ($P_{out1}+P_{out2}$) along EDF both directions;

DETAILED DESCRIPTION OF THE PREFERRED EMBODIMENTS

First, before describing an optical amplifying apparatus for transmitting wavelength division multiplexed signal light and also an optical network with employment of this optical amplifying apparatus, according to the present invention, a problem caused by the conventional wavelength division multiplexed signal light transmitting apparatus and the conventional optical network will now be explained in order to easily understand the present invention.

Generally speaking, as a basic method for controlling an optical amplifier, there are provided a method for controlling an output of a pumping light source of an optical amplifier by way of an ALC (Automatic Level Control) soas to maintain a constant output, and also another method for controlling an output of a pumping light source by way of an AGC (Automatic Gain Control) in order to maintain a constant gain.

As a first explanation, the gain of the optical amplifier is controlled by employing the ALC system. When a total channel number of signal light to be transmitted is changed, the gain of the optical amplifier is controlled in such a manner that the output of the optical amplifier becomes constant by the ALC system. Otherwise, the gain of the optical amplifier is clamped by a maximum gain value. In any one of the cases, the output per 1 channel is changed.

As a result, the following arrangement is provided. To suppress the change in the total channel number in such a case that the gain is controlled by way of the ALC system, the gain is controlled by supplying the information about the channel number to the optical amplifier by using the monitoring signal. However, in accordance with this method, since the gain is not controlled in synchronism with the change in the channel number, there is such a problem that the level produced immediately after the channel is changed cannot be compensated.

Figure 1:
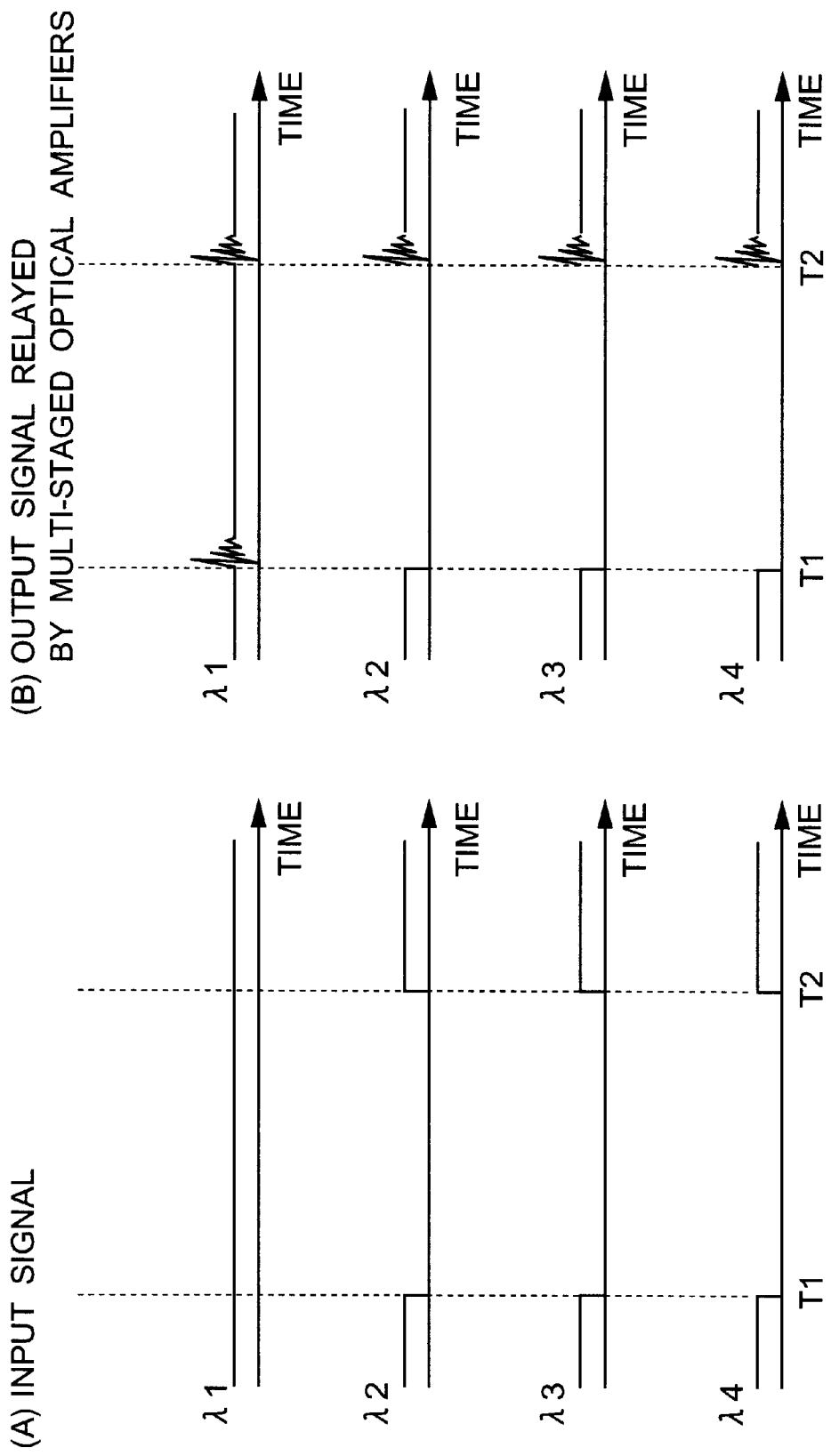
FIG. 1 is a diagram for representing deterioration conditions of transmission characteristics for a channel having a wavelength of "λ1" corresponding to an existing channel in the case that a total number of channels is changed in a transmission system in which a large number of optical amplifiers are relayed, i.e.

The prior art publication 1 describes the transition response of the output in the system such that a large number of optical amplifiers controlled only by the ALC system are relayed when the input level of the optical amplifier is varied. This publication 1 describes such a case that the gain control is carried out only by way of the ALC system (note that when gain becomes maximum value, this gain is clamped). Even when the gain is controlled by way of the ALC control system in such a manner that the output is changed in response to the channel number information by the SV signal, since only the ALC control is operable in the initial stage of the transition response, the same operation is carried out. As described in this publication 1, the transition response speed of the output is increased in proportional to the relay stage number. As a result, when the total channel number is changed in the transmission system such that a large number of optical amplifiers are relayed, as indicated in FIG. 1, the transmission characteristic of the channel having wavelength of "λ1" corresponding to the existing channel is considerably deteriorated.

The prior art publication 2 describes that even when the gain of the optical amplifier is controlled by using the AGC system, the level of the remaining channel is varied if the total channel number is varied. The prior art publication 3 describes the technique capable of suppressing the level change in the remaining channel when the above-explained total channel number is varied. The prior art publication 3 discloses such an arrangement that while the output compensating channel with employment of the wavelength other than that of the transmission signal channel is provided at the output of each of the nodes, the output derived from the node is maintained as a constant value.

Figure 2:
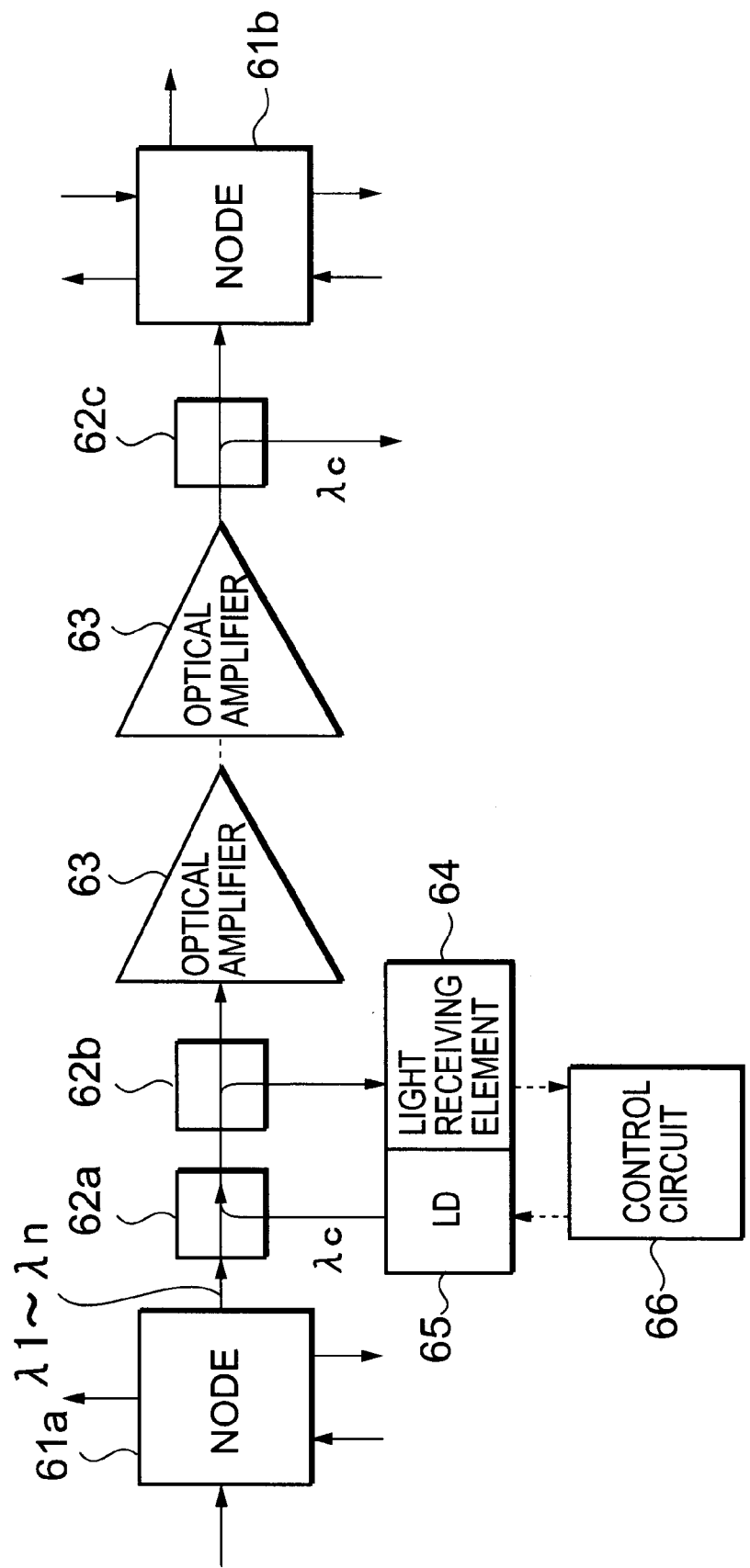
FIG. 2 is a structural diagram for indicating an example of an arrangement of a conventional wavelength division multiplexed signal light transmitting apparatus.

FIG. 2 is a schematic diagram for representing the arrangement of the wavelength division multiplexed signal light transmitting apparatus for suppressing the level change in the remaining channel when the channel number is changed in the wavelength division multiplexed signal light transmission, which is described in the prior art publication 2. Even when the total channel number of the signal light is changed which is transmitted from the node 61a to the node 61b, while a portion of the output is monitored by the light receiving element 64, the compensating output is derived from the LD having the wavelength of "λc" in such a manner that the monitored output from the light receiving element 64 is made constant. As a result, the optical power entered into the optical amplifier 63 becomes constant, and the level variation in the existing channel is suppressed irrespective of turning ON/OFF of another channel.

FIG. 3 represents an example of the spectrum of the signal light in the wavelength division multiplexed signal light transmitting apparatus of the prior art publication 2, i.e., FIG. 3(A) shows such a condition that while all of 8 channels (λ1 to λ8) of signal light to be transmitted are operated, an output compensating channel (λc) is not operated; and FIG. 3(B) indicates such a condition that while only one channel for the signal light to be transmitted is available, the output compensating channel (λc) isoperated. In total, the transmission signals areprovided for 8 channels (λ1 to λ8), and the output compensating channel is provided for 1 channel (λc). FIG. 3A represents the spectrum in the case that all of the 8 channels are under operation. FIG. 3B represents the spectrum in the case that the transmission signal is transmitted while only 1 channel is operated. The output compensating channel "λc" outputs power available for 7 channels in order to become the output obtained when all of the 8 channels are operated.

However, as previously explained, in the transmission path in the optical network, when the adjusting signal light is employed by using a new wavelength band in order to compensate for the level variation in the existing channel while the total channel number is changed, the originally limited wavelength band of the optical amplifier is furthermore restricted. In addition, when the signal light having the wavelength different from that of the transmission channel is employed so as to compensate for the level variation of the existing channel in the transmission path, it is required to introduce such an LD capable of stabilizing the levels of the respective channels.

ARRANGEMENT OF FIRST WAVELENGTH DIVISION MULTIPLEXED SIGNAL LIGHT TRANSMISSION OPTICAL AMPLIFYING APPARATUS

Referring now to drawings, a description will be made of an optical amplifying apparatus for transmitting wavelength division multiplexed signal light, according to the present invention, in detail.

Figure 4:
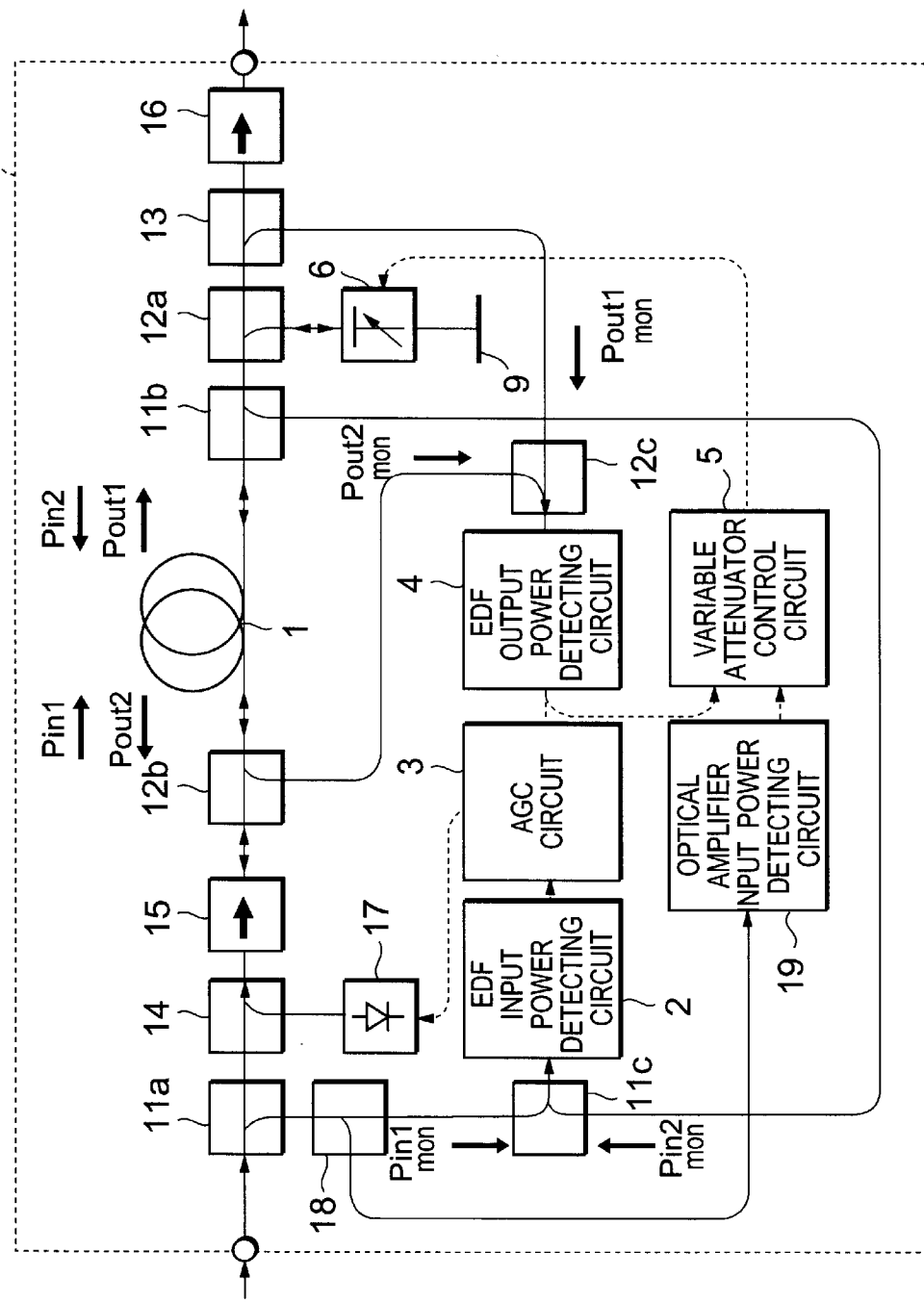
FIG. 4 is a schematic block diagram for representing an arrangement of an optical amplifying apparatus for transmitting wavelength division multiplexed signal light, according to a first embodiment of the present invention.

FIG. 4 is a schematic block diagram for representing an arrangement of an optical amplifying apparatus for transmitting wavelength division multiplexed signal light, according to a first embodiment of the present invention.

As a basic structure, the optical amplifying apparatus of the present invention is equipped with an erbium doped optical fiber (will be referred to as an "EDF" hereinafter) 1 functioning as an amplifying optical fiber; a pumping light source 17 for outputting pumping light; and a wavelength division multiplexer 14 for multiplexing the pumping light on signal light which is entered froma left direction, as viewed in this drawing. To avoid an occurrence of noise caused by light returned from a reflection point located in a transmission path, optical isolators 15 and 16 are arranged.

It should be noted that since light having a wavelength band of 1.55 μm is employed as the signal light and also light having a wavelength of either 1.48 μm or 0.98 μm in this embodiment, as explained above, the EDF (erbium doped optical fiber) is employed as the amplifying optical fiber. As this amplifying optical fiber, not only this EDF, but also other optical fibers maybe selected, namely optical fibers to which various rare earth elements are added are selectable, depending upon wavelength bands of signal light which is optically amplified.

In addition to the above-explained basic structure, in the optical amplifying apparatus of the present invention, an optical branching device 11a (second optical branching device) for branching a portion of the signal light entered into the EDF 1 is first arranged on the input side of this EDF 1. On the other hand, another optical branching device 12a (first optical branching device) is arranged on the output side of the EDF 1. The optical branching device 12a branches a portion of signal light (will be referred to as "amplified signal light" hereinafter) which is optically amplified by the EDF 1 and then is traveled toward an exit direction (namely, right direction, as viewed in the drawing). Furthermore, another optical branching device 13 (fourth optical branching device) for similarly branching a portion of the amplified signal light is arranged on the output side of the EDF 1. In addition, a further optical branching device 11b (third branching device) for branching a portion of signal light which is traveled toward the input direction (namely, left direction, as viewed in this drawing) is arranged between the EDF 1 and the optical branching device 12a. It should be understood that the optical branching device may be apparently replaced by an optical directional coupling device.

In this embodiment, an optical variable attenuator 6 is arranged on the side of the optical path branched from the optical branching device 12a, and furthermore, a reflector 9 is arranged on the output side of this optical variable attenuator 6. As a result, the amplified signal light branched by the optical branching device 12a, the optical level of which is controlled by the optical variable attenuator 6, passes through this optical variable attenuator 6, and then the attenuated signal light reaches the reflector 9 to be reflected on this reflector 9. The reflected signal light is furthermore, optically amplifiedby the EDF 1. Then, the amplified signal light is outputted toward the input side (namely, left direction, as viewed in this drawing).

Returning back to the input side of the EDF 1, another optical branching device (fifth optical branching device) 12b is arranged between the optical isolator 15 and the EDF 1. This optical branching device 12b branches a portion of light which is traveled along a direction opposite to the travel direction of the signal light. In this optical branching device 12b, a portion of the above-described signal light which is reflected on the above reflector 9 and then is again optically amplified is branched. The optical branching device 12b owns such an object to derive the signal traveled along the opposite direction. As a consequence, an optical circulator (second optical circulator) may be employed. This optical circulator may output the signal light entered along the left direction (as viewed in the drawing) to the EDF 1, and may output such signal light which is outputted from the EDF 1 along the left direction (as viewed in the drawing) and then is again amplified along a direction as viewed in the drawing.

The signal light which is branched by the optical branching device 11a and then is derived is further branched. One branched light is entered into an optical amplifier input power detecting circuit 19. The other branched light is entered into a monitor optical coupler 11a (first optical coupler). The amplified signal light which is branched by the optical branching device 11b and then is reflected is entered from another input of the monitor optical coupler 11c. Both one branched signal light and the other branched signal light are optically coupled to each other by the monitor optical coupling device 11c, and then the coupled signal light is outputted therefrom to an EDF input power detecting circuit 2.

The amplified signal light branched by the optical branching device 13 and the optical branching device 12b, respectively, and also the signal light which is reflected and then is again amplified are inputted to an optical coupler (second optical coupler). Both the branched signal light and the amplified signal light are optically coupled to each other, and then the optically coupled signal light is outputted therefrom to the EDF output power detecting circuit 4. A variable attenuator control circuit 5 is connected to both the optical amplifier input power detecting circuit 19 and the EDF output power detecting circuit 4, and the detection results derived from both the detecting/control circuits 19/4 are entered to this variable attenuator control circuit 5. The above-explained variable attenuator 6 receives the control signal supplied from this variable attenuator control circuit 5 so as to control the attenuation amount thereof.

An AGC (automatic gain control) circuit 3 is connected to the EDF input power 2 and the EDF output power detecting circuit 4. The AGC circuit 3 detects both the signal light power entered into the EDF 1 and the power of the amplified signal light which is optically amplified by the EDF 1 and is outputted. Then, this AGC circuit 3 controls the gain of the EDF 1 in such a manner that this gain becomes constant based on the detected power of the signal light.

OPERATION OF OPTICAL AMPLIFYING APPARATUS FOR TRANSMITTING WAVELENGTH DIVISION MULTIPLEXED SIGNAL LIGHT

Next, operation of the optical amplifying apparatus for transmitting the wavelength division multiplexed signal light, according to the present invention, will now be explained more in detail.

In FIG. 4, either 1 channel of signal light having a single wavelength or plural channels of wavelength division multiplexed signal light, the plural different wavelengths of which are division-multiplexed, are entered into the optical amplifying apparatus 22 along the left direction (will be referred to as a "forward direction" hereinafter), as viewed in this drawing. A portion of the entered signal light (will be referred to as "signal light" also containing wavelength division multiplexed signal light hereinafter) is firstly branched by the optical branching device 11a. The branched signal light is furthermore branched. A level of one branched signal light is detected by the optical amplifier input power detecting circuit 19. The other branched signal light is entered via the optical coupler 11c to the EDF input power detecting circuit 2. Since the optical isolators 15 and 16 are provided in series with the EDF 1, the light output along the opposite (backward) direction is suppressed so that this light output does not give any adverse influence to both the pumping light source 17 and the optical amplifier provided at the pre-stage.

As previously explained, the original signal light which passes through the optical branching device 11a is multiplexed with the pumping light supplied from the pumping light source 17 in the wavelength division multiplexer 14. The multiplexed signal light is entered into the erbium doped optical fiber (will be referred to as an "EDF" hereinafter) 1 so as to be optically amplified. Then, the optically amplified signal light is outputted from this EDF 1.

A portion of this amplified signal light is branched by the optical branching device 12a, and the branched signal light is reached to the reflector 9 after passing through the variable attenuator 6. The amplified signal light which is reflected on this reflector 9 is again entered into the EDF 1 from the opposite direction (will be referred to as a "backward direction" hereinafter). The amplified signal light entered along the backward direction is further, optically amplified in the EDF 1, and then the amplified signal light is outputted to the front direction (namely, left direction, as viewed in the drawing). The signal light which is outputted to the front side of the EDF 1 along the backward direction and is again amplified is outputted from the optical branching device (or optical circulator) 12b along the lower direction, as viewed in this drawing.

On the other hand, a portion of the amplified signal light which passes through the optical branching device 12a is further branched by the optical branching device 13. One branched signal light directly passes through the optical isolator 16, and then is outputted to the transmission path as the original signal light. The other branched signal light is entered as the monitor light into the optical coupler 12c so as to be optically coupled to the signal light which is outputted from the optical branching device 12b and then is again amplified in this optical coupler 12c. The coupled signal light is inputted to the EDF output power detecting circuit 4 so as to detect the output level thereof.

The amplified signal light which is outputted from the optical branching device 12a along the backward direction is outputted from the optical branching device 11b along the lower direction, as viewed in this drawing. This output amplified signal light is coupled to the branched signal light before being entered into the EDF 1 by the optical coupler 11c, and then the coupled signal light is inputted to the EDF input power detecting circuit 2. The synthesized signal light of the EDF 1 obtained from the input signal light along the forward direction and the input signal light along the backward direction is monitored by the EDF input power detecting circuit 2.

The synthesized signal light of the EDF 1 obtained from the output signal light along the forward direction and the output signal light along the backward direction is monitored by the EDF output power detecting circuit 4. Based upon monitored result by this EDF output power detecting circuit 4, the variable attenuator control circuit 5 controls the attenuation amount of the variable attenuator 6 in the ALC (automatic level control) manner in order that the synthesized output power of the amplified signal light of the EDF 1 along the forward direction and the backward direction becomes constant. In this embodiment, the variable attenuator 6 is arranged before the reflector 9, and the output level is controlled by controlling the transmission loss of the variable attenuator 6. Alternatively, while this variable attenuator 6 is replaced by such a reflector capable of variably controlling its reflectivity, the light output along the backward direction may be controlled by controlling the reflectivity. Also, the level of the amplified signal light which is again entered into the EDF 1 may be controlled by varying the branching ratio of the optical branching device 12a.

The AGC circuit 3 controls the pumping light outputted from the pumping light source 17 in such a manner that the gain of the optical amplification in the EDF 1 becomes constant based upon the monitored results of the EDF input power detecting circuit 2 and the EDF output power detecting circuit 4.

In accordance with the above-described arrangement, the level of the amplified signal light outputted from the optical amplifying apparatus 22 is controlled to be such a level that the light outputted from the EDF 1 along the forward direction, namely the signal light inputted into the optical amplifying apparatus 2 is amplified by a preset gain. As a result, even when the total channel number of the inputted signal light is varied, there is no change in the levels with respect to each of the channels. Even during the transition response in such a case that the channel number of the entered signal light is changed by, for example, the signal light insert condition in the optical ADM provided at the pre-stage, and also by newly initiating the optical transmitter, the variable attenuator 6 is controlled by the ALC control, so that the level of the input side which constitutes the reference of the gain control is kept constant. As a consequence, there is no level change in the existing channels.

Furthermore, even when the operation channel becomes 0 channel, namely even under non-signal light condition, the optical amplifier input power detecting circuit 19 detects that the channel of the signal light entered into the optical amplifying apparatus 22 is equal to 0. Based upon this detection value, the variable attenuator control circuit 5 controls the attenuation amount of the variable attenuator 6 to become the maximum value thereof. As a result, even when the optical transmission is restarted and the signal light is newly entered into the optical amplifying apparatus 22, no optical surge occurs.

DETAILED EFFECTS OF FIRST OPTICAL AMPLIFYING APPARATUS

The above-explained effects achieved by the optical amplifying apparatus of the present invention will now be described more in detail.

In FIG. 4, the signal light inputted into the optical amplifier 22 is amplified in the EDF 1. A portion of this amplified signal light is branched by the optical branching device 12a, and then this branched signal light passes through the variable attenuator 6 and is reflected by the reflector 9. The reflected signal light is again traveled through the variable attenuator 6 and the optical branching device 12a to be returned to this EDF 1 along the backward direction. Then, this returned signal light is again amplified. In other words, an input "$P_{in2}$" is entered into the EDF 1 along the backward direction in addition to the input "$P_{in1}$" along the forward direction, and both these inputs $P_{in1}$ and $P_{in2}$ are amplified by this EDF 1 to output an output "$P_{out1}$" along the forward direction and another output "$P_{out2}$" along the backward direction.

A summed value of a monitored value "$P_{in1mon}$" (via optical branching device 11a□18□11c) of the forward direction input $P_{in1}$ for the EDF 1, and another monitored value "$P_{in2mon}$" (via optical branching device 12a□11b□11c) of the backward direction input $P_{in2}$ thereof is monitored by the EDF input power detecting circuit 2. Similarly, a summed value of a monitored value "$P_{out1mon}$" (via optical branching device 13□12c) of the forward direction output $P_{out1}$ for the EDF 1, and another monitored value "$P_{out1mon}$" (via optical branching device 12b□12c) of the backward direction output $P_{out2}$ thereof is monitored by the EDF output power detecting circuit 4.

In this case, a branching ratio of the optical branching devices 11a, 11b, 11c, 12b, 12c, 13, and 18 is set to satisfy the following condition:

$P_{in1} \cdot P_{in2} \cdot P_{out1} \cdot P_{out2} = P_{in1mon} \cdot P_{in2mon} \cdot P_{out1mon} \cdot P_{out2mon}$ A branching ratio of the optical branching device 11b to the optical branching device 12a is related to the backward input $P_{in2}$ of the EDF 1. Accordingly, in the case that the attenuation amount of the variable attenuator 6 is minimized when the operation channel is 1 channel, the signal light inputted to the EDF 1 must have such power higher than the power of all of the signal light when all channels are operated.

The AGC circuit 3 controls the pumping light outputted from the pumping light source 17, while satisfying the below-mentioned relationship in accordance with the detection results of the EDF input power detecting circuit 2 and the EDF output power detecting circuit 4, namely the total input power of the signal light entered to the EDF 1 along both the forward and backward directions, and the total output power of the signal light derived from the EDF 1 along both the forward and backward directions:

$$P_{out1}+P_{out2}=A\square(P_{in1}+P_{in2}) \quad \text{[A: gain]}$$

As a result, the gain "A" of the optical amplifier 22 is controlled so as to become constant.

The variable attenuator control circuit 5 controls the attenuation amount of the variable attenuator 6 in such a manner that the detection result of the EDF output power detecting circuit 4, namely the total output power of the signal light outputted from the EDF 1 along both the forward and backward directions becomes as follows:

$$P_{out1}+P_{out2}=Pa \quad \text{[Pa: set output]}$$

Since such a control operation is carried out, even when the total number of channels to be transmitted is changed, the levels of the respective channels can be made constant.

TRANSITION RESPONSE CONDITIONS OCCURRED WHEN CHANNEL NUMBER IS CHANGED

Subsequently, a description will be made of transition response conditions occurred when a total channel number is changed.

As explained above, in the optical amplifying apparatus of the present invention, two sorts of control operations are carried out, namely the AGC control for controlling the gain of the EDF 1, and the ALC control for making the forward direction output and the backward direction output constant. Since the AGC control operation is carried out in such a way that the gain is made constant irrespective of the input signal light, the transition response occurred when the total channel number is changed is determined based upon the response speed of the ALC control involving the variable attenuator 1. As a result, the response speed of the ALC may respond to the power variation caused by the change in the total channel number. With employment of such an arrangement, there is no level change in the existing channel during the transition response when the total channel number is varied.

The above-explained items are related to such operations when the total number of the operation channels is larger than, or equal to 1. Next, another explanation will be made of operations in the case that the total number of operation channels becomes 0, or is increased from 0 to 1 or more.

In the case that input light is branched by the optical branching devices 11a and 18 and the branched light is monitored by the optical amplifier input power detecting circuit 19, and then the monitored value by this optical amplifier input power detecting circuit 19 is lower than, or equal to the set input power (namely, power output when operation channel number is 1 channel or less), the variable attenuator control circuit 5 makes the attenuation amount of the variable attenuator 6 maximum. As a result, the control operation of the optical amplifier 22 in such a case that the operation channel is 0 channel is realized only by the AGC control of the EDF 1, and the output of the optical amplifier becomes a noise level.

In such a case that the operation channel is changed from 0 channel to more than 1 channel, the input power which is branched via the optical branching devices 11a and 18 becomes power of more than 1 channel. As a result, the variable attenuator 6 is controlled by the ALC control in addition to the AGC control for controlling the gain of the EDF 1. In this case, in the transition response, since the EDF 1 is controlled only by the AGC control, even when the operation channel number becomes from 0 to 1, or more, no optical surge occurs. As described above, the response speed of the ALC control for controlling the attenuation amount of the variable attenuator 6 can respond to the change in the total channel number. As a result the level variation of the operation channel may also be suppressed.

Figure 5:
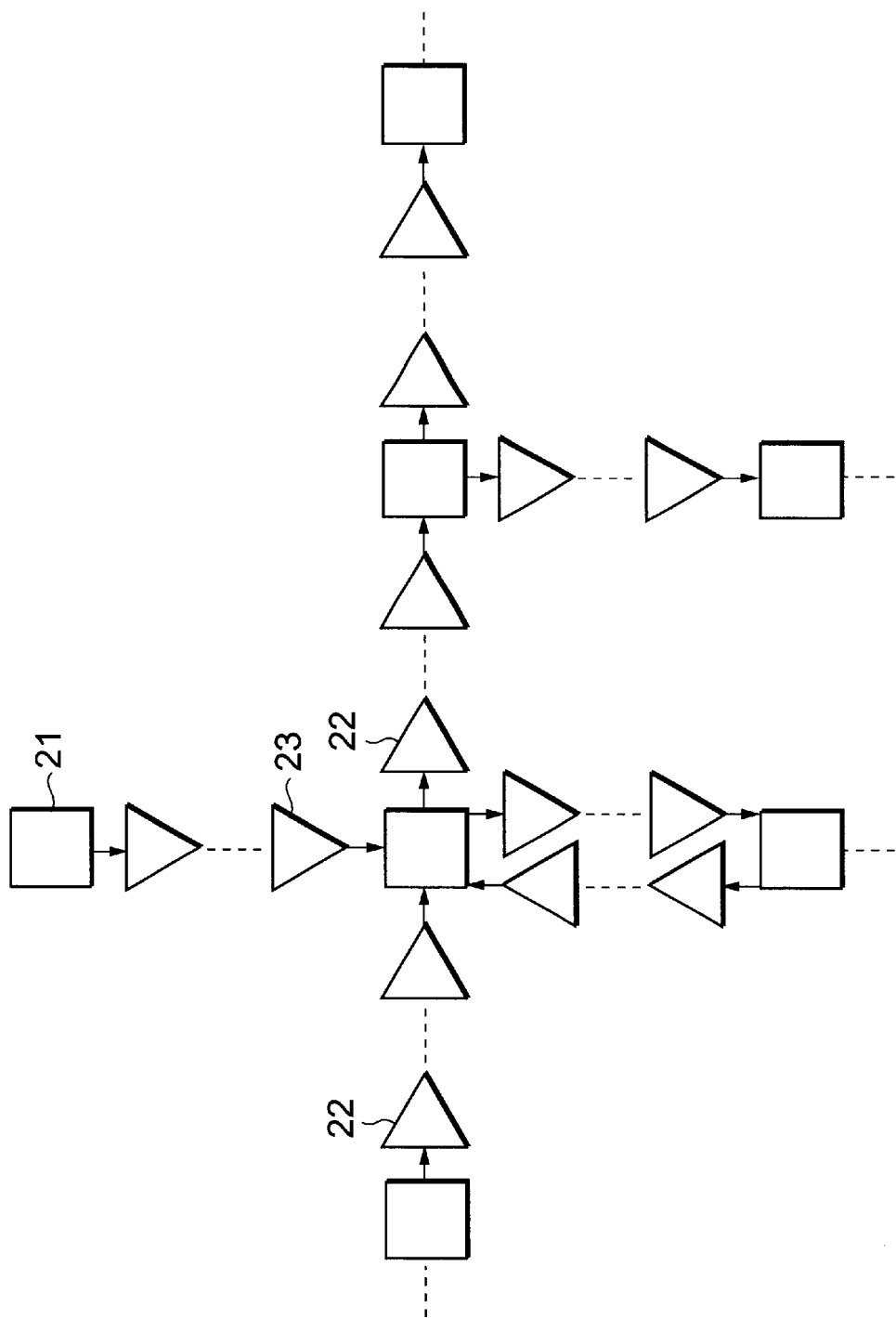
FIG. 5 is a structural diagram for indicating an example in which the optical amplifying apparatus for transmitting the wavelength division for multiplexed signal light according to the present invention is applied to a wavelength division multiplexed signal light transmitting apparatus having an optical ADM as a node.

It should be understood that the optical amplifying apparatus according to the present invention may effectively function even in an optical network, for example, as shown in FIG. 5, containing a node having an optical ADM function, which is inserted into a transmission path every wavelength channel, and is branched. For instance, in the optical network shown in FIG. 5, a plurality of optical relay apparatuses are connected to an optical ADM 23, into/from which the wavelength division multiplexed signal light is normally inputted/outputted. Now, for instance, when the optical transmitter 21 is newly initiated, the total channel number of the signal lights which is outputted via the optical ADM 23 to a right side thereof is increased by 1, so that the total channel number is changed.

Even in such a case, in accordance with the optical amplifying apparatus of the present invention, when the total number of wavelength-division-multiplexed channels is varied, the transmission characteristic of such a channel for continuously transmitting signal light (will be referred to as an "existing channel" hereinafter) is not adversely influenced by turning ON/OFF another channel, the signal light can be transmitted in the stable level. Even when the total number of operation channels is increased from 0 channel to 1 channel, or more, the optical amplifier according to the present invention can prevent the occurrence of optical surge.

OPERATION OF FIRST EMBODIMENT

Referring now to a flow chart shown in FIG. 6, operation of the first embodiment of the present invention, which is represented in FIG. 4, will be described.

Figure 6:
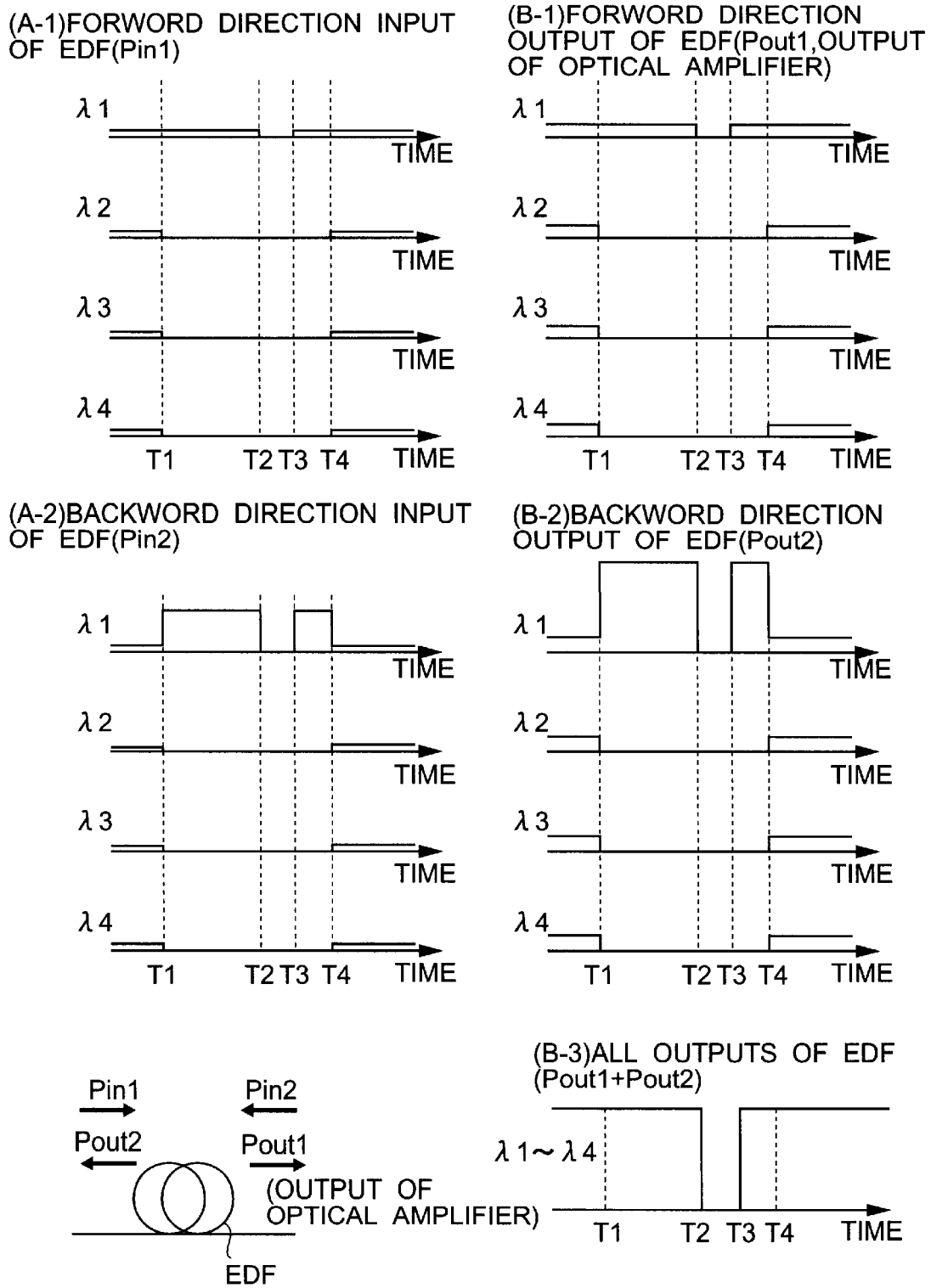
FIG. 6 is a level change diagram with respect to each of wavelength channels in such a case that 4 channels of signal light in total are transmitted by employing the optical amplifying apparatus for transmitting the wavelength division multiplexed signal light according to the present invention, when the operating channel number is changed into 4 channels (t<T1), 1 channel (T1<t<T2), 0 channel (T2<t<T3), 1 channel (T3<t<T4), and 4 channels (t>T4), i.e.

FIG. 6 is a level change diagram with respect to each of wavelength channels in such a case that 4 channels of signal light in total are transmitted by employing the optical amplifying apparatus for transmitting the wavelength division multiplexed signal light according to the present invention, when the operating channel number is changed into 4 channels (t<T1), 1 channel (T1<t<T2), 0 channel (T2<t<T3), 1 channel (T3<t<T4), and 4 channels (t>T4). FIG. 6A-1 shows a channel level change in an input $P_{in1}$ along EDF forward direction. FIG. 6A-2 shows a channel level change in an input $P_{in2}$ along EDF backward direction. FIG. 6B-1 indicates an output (output of optical amplifier) $P_{out1}$ along EDF forward direction. FIG. 6B-2 indicates an output $P_{out2}$ along EDF backward direction. FIG. 6B-3 indicates an output ($P_{out1}+P_{out2}$) along EDF both directions.

At the time instant t<T1, since the input channel is 4 channels, the forward direction input $P_{in1}$ of the EDF is 4 channels. At this time, as to the channel of the backward direction input $P_{in2}$ to the EDF, since all of the 4 channels for the forward direction inputs $P_{in2}$ are operated, any channels of the backward direction input $P_{in2}$ become 0 due to the ALC control of the variable attenuator. At this time, the output (Pout1) of the optical amplifier is equal to a value made by multiplying each of the input signal channels by a gain set by the AGC control.

Next, at the time instant T1<t<T2, since the input channel becomes only 1 channel having the wavelength of "λ1", the forward direction input $P_{in1}$ of the EDF becomes only 1 channel. At this time, the backward output $P_{out1}$ of the EDF is controlled in the ALC control manner by the variable attenuator in such a manner that the total output ($P_{out1}+P_{out2}$) along the forward direction and the backward direction as indicated in FIG. 6B-3 becomes constant, so that the backward direction input $P_{in2}$ is increased (FIG. 6A-2). Also, in this case, the value made by multiplying the input signal channel having the wavelength of "λ1" by the gain becomes the output from the optical amplifying apparatus.

In the transition response of the change in the total channel number at the time instant t=T1, since the attenuation amount of the variable attenuator is controlled in the ALC control manner, the level of the output from the optical amplifier of the wavelength channel (wavelength being "λ1") corresponding to the existing channel is not varied, namely is under stable condition.

At the time instant t=T2, when the total number of operation channels becomes 0, the ALC control operation of the variable attenuator is stopped and thus, the attenuation amount becomes maximum and only the AGC control operation of the EDF becomes effective. At the time instant T2<t<T3, since only the AGC control operation of the EDF becomes effective, the level of the output ($P_{out1}$) of the optical amplifier becomes a noise level. At the time instant t=T3, when the total number of the operation channels is changed from 0 to 1 channel, the ALC control operation of the variable attenuator is again commenced. At this time, since the gain control operation of the EDF is performed by way of the AGC control operation, no optical surge is produced. The level change in the initiated channel is similarly suppressed by way of the ALC control operation of the variable attenuator.

Similar to the operation at the time instant t=T1, also at the time instant t=T4, the level variation does not occur. Similar to the operation at the time instant t<T1, also at the time instant t>T4, since the forward direction input $P_{in1}$ of the EDF is 4 channels, the backward direction input $P_{in2}$ not entered to the EDF, so that the levels in the respective channels are maintained at a constant level.

Figure 7:
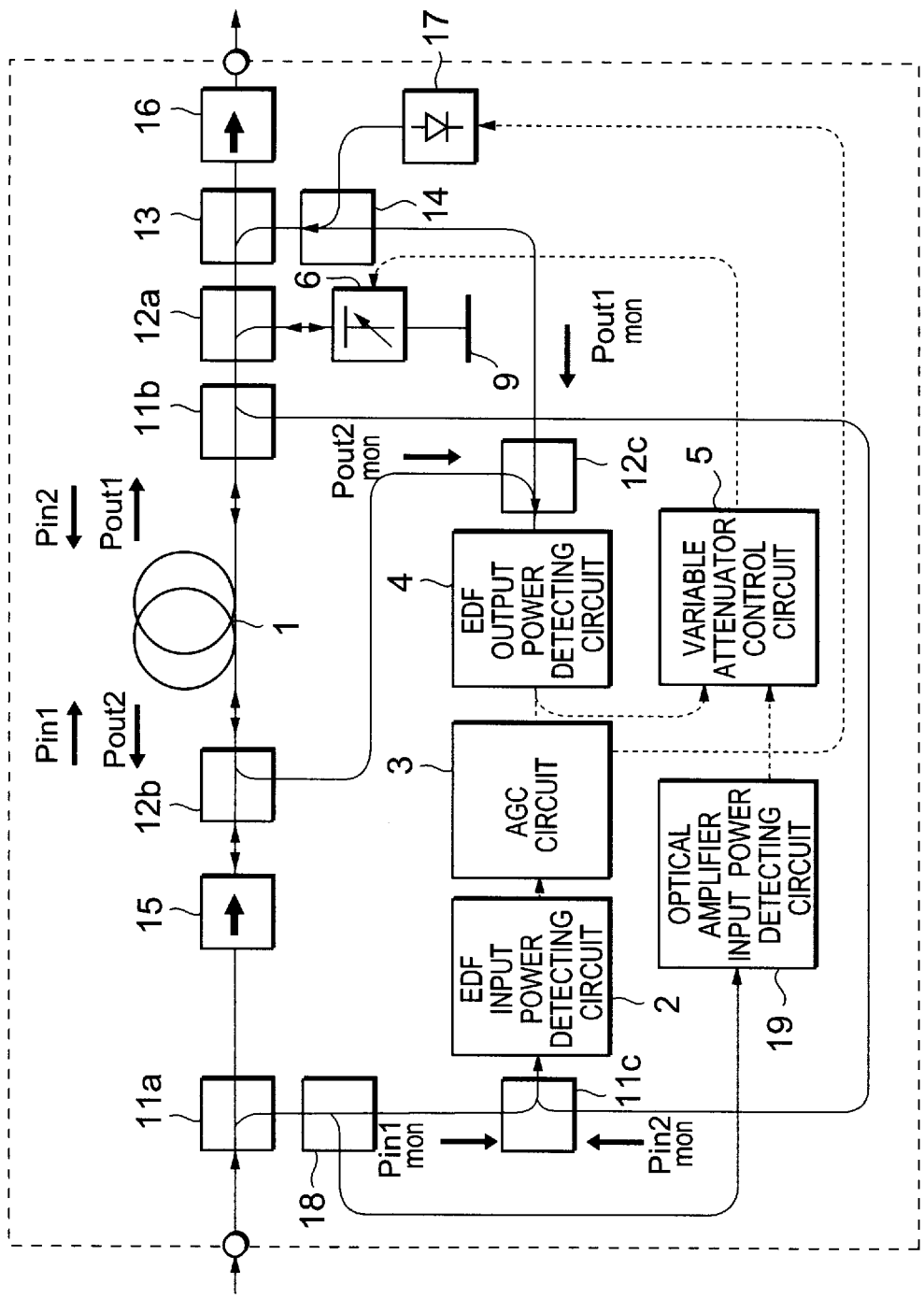
FIG. 7 is a schematic block diagram for showing an arrangement of an optical amplifying apparatus for transmitting wavelength division multiplexed signal light according to a second embodiment of the present invention.

Next, an optical amplifying apparatus according to a second embodiment of the present invention will be now described with respect to FIG. 7.

FIG. 7 is a schematic block diagram for representing an arrangement of an optical amplifying apparatus for transmitting wavelength division multiplexed signal light, according to a second embodiment of the present invention.

This optical amplifying apparatus is featured by such an arrangement that the pumping light of the pumping light source 17 is entered from the wavelength division multiplexer 14 located between the optical branching device 12c and the optical branching device 13, and furthermore, the optical amplifying apparatus 22 is arranged in the backward pumping manner.

The arrangement of this optical amplifying apparatus shown in FIG. 7 is the same as that shown in FIG. 4 except that the pumping light is entered into the EDF 1 in the backward direction, and thus can achieve the similar effect.

The wavelength division multiplexer 14 may be replaced by such an optical circulator that while the amplified signal light branched by the optical branching device 13 is conducted as the monitor light to the optical coupler 12c, the pumping light outputted from the pumping light source 17 is outputted toward the optical branching device 13. Alternatively, a wavelength division multiplexer may be arranged at a pre-stage, or a post-stage of the optical branching device 13, and the pumping light may be entered from this wavelength division multiplexer along the backward direction.

Figure 8:
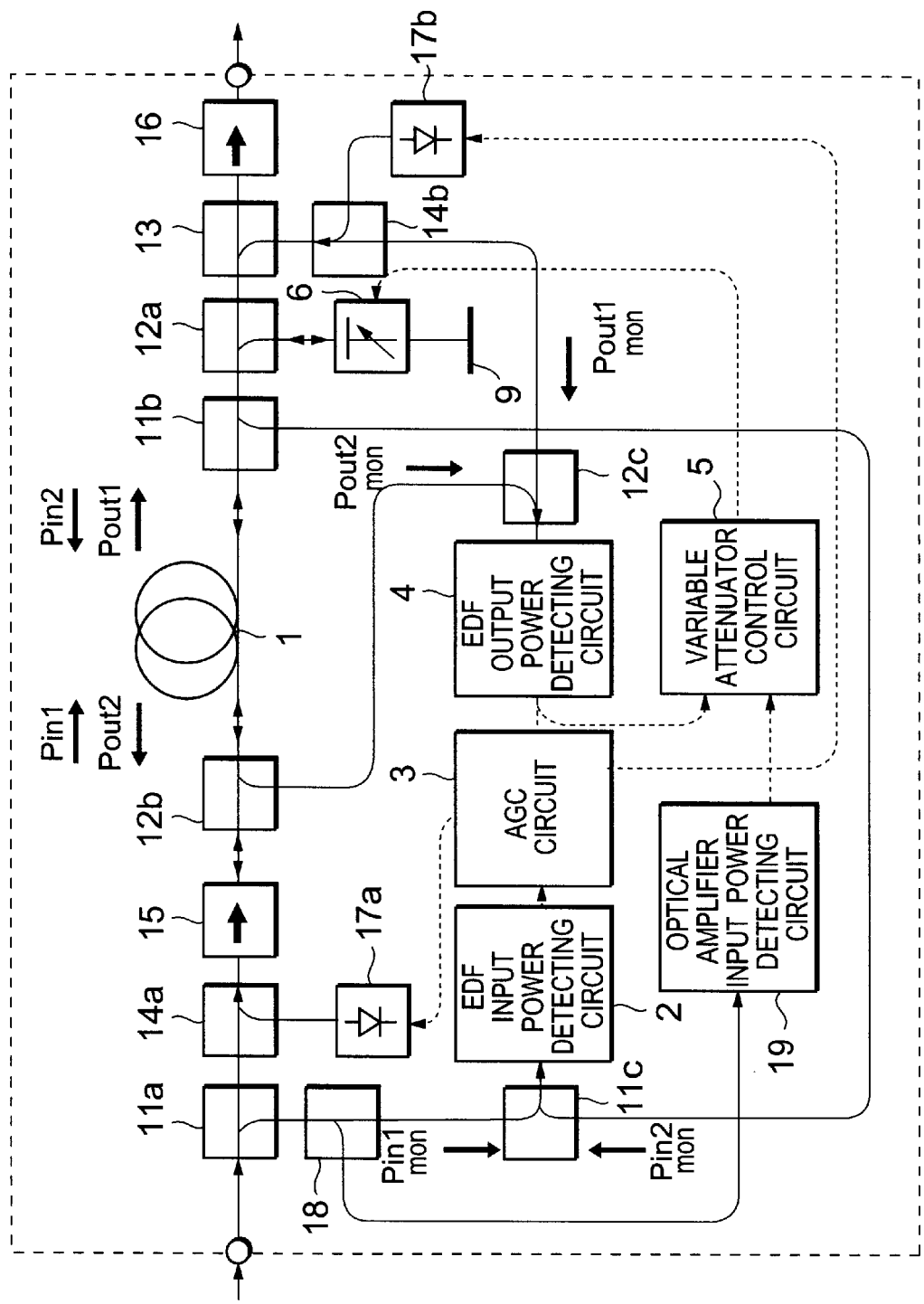
FIG. 8 is a schematic block diagram for showing an arrangement of an optical amplifying apparatus for transmitting wavelength division multiplexed signal light according to a third embodiment of the present invention.

FIG. 8 is a schematic block diagram for representing an arrangement of an optical amplifying apparatus for transmitting wavelength division multiplexed signal light, according to a third embodiment of the present invention.

This optical amplifying apparatus is featured by such an arrangement that two sets of pumping light of pumping light sources are entered into the EDF along both the forward direction and the backward direction, namely the pumping light arrangement along the dual direction. Similar to the optical amplifying apparatus shown in FIG. 7, also in this third embodiment, the wavelength division multiplexer 14b may be replaced by an optical circulator (third optical circulator). Alternatively, while a wavelength division multiplexer is arranged at a pre-stage, or a post-stage of the optical branching device 13, the pumping light may be entered from this wavelength division multiplexer along the backward direction.

Figure 9:
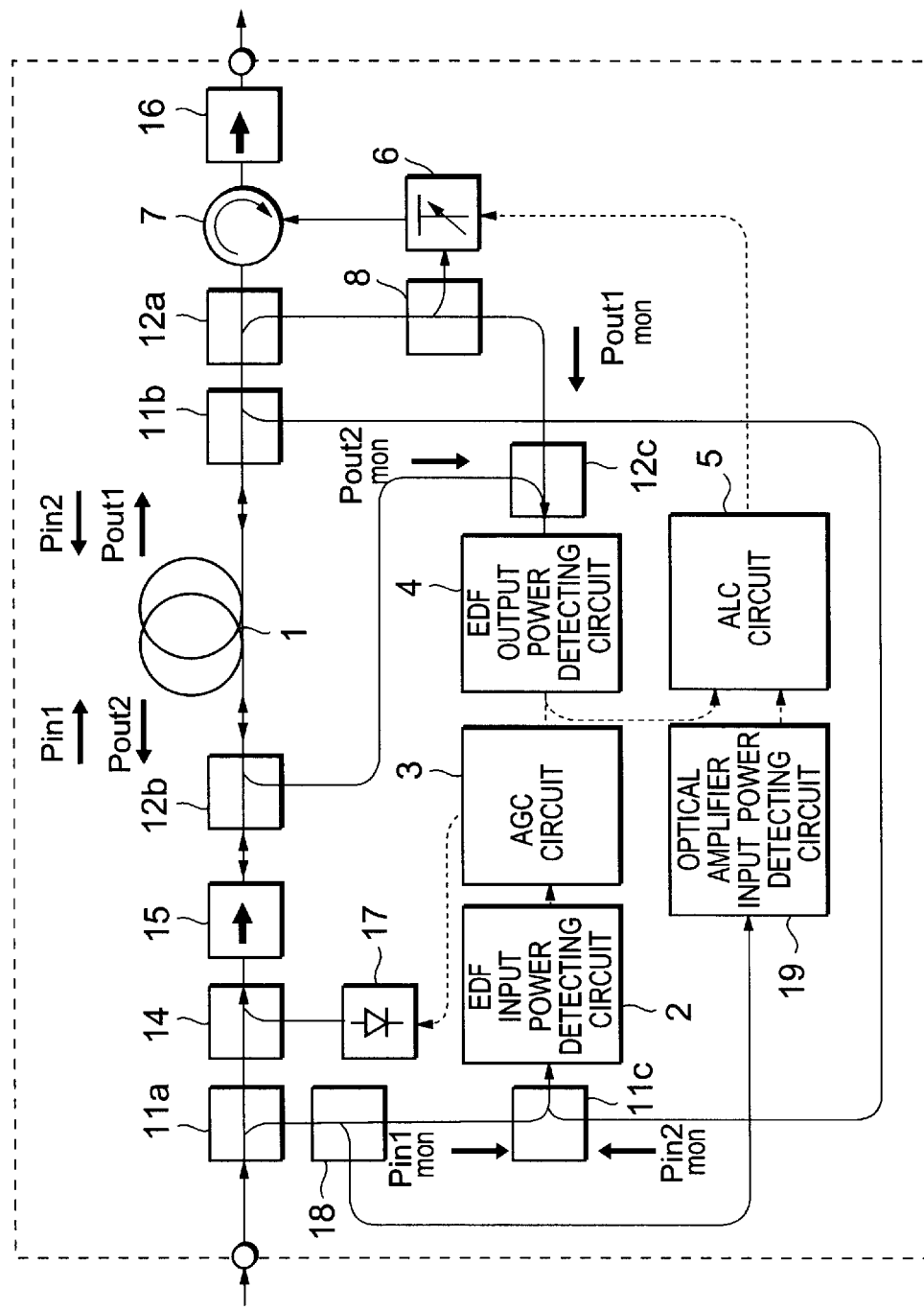
FIG. 9 is a schematic block diagram for showing an arrangement of an optical amplifying apparatus for transmitting wavelength division multiplexed signal light according to a fourth embodiment of the present invention.

FIG. 9 is a schematic block diagram for representing an arrangement of an optical amplifying apparatus for transmitting wavelength division multiplexed signal light, according to a fourth embodiment of the present invention. This optical amplifying apparatus is featured by such an arrangement that while the reflector 9 of FIG. 4 is replaced by the optical circulator 7, a portion of the amplified signal light is entered into the EDF 1 along the backward direction. The amplified signal light which passes through the optical branching device 12a is directly penetrated via the optical circulator 7 and the optical isolator to the optical transmission path. On the other hand, a portion of the amplified signal light branched by the light branching device 12a is furthermore branched by the optical branching device 8. Similar to the above explanation, the attenuation amount of this amplified signal light branched by the optical branching device 8 is controlled by the variable attenuator 6 in response to the control signal sent from the ALC circuit 5, and then, the attenuated signal light is again entered into the EDF 1 along the backward direction via the optical circulator 7 (first optical circulator).

Similar to the second embodiment and the third embodiment, also in this fourth embodiment, the optical amplifying apparatus may be operated in the backward pumping manner, or the forward pumping manner. Although the fourth embodiment owns such a structure that no reflector is employed, the present invention is not limited to the structure shown in FIG. 9. For example, the above-described arrangement is constructed in such a manner that the amplified signal light branched from the optical branching device 12a is further branched by the optical branching device 8. Alternatively, the optical branching device 8 may be arranged at a post-stage of the optical branching device 12a, or a pre-stage thereof. Also, the optical circulator 7 may be arranged not at the post-stage of the optical branching device 12a, but at the pre-stage thereof.

As previously explained, the optical amplifying apparatus for transmitting the wavelength division multiplexed signal light, according to the present invention, employs such a structure that even when a total number of input channels is changed, a portion of the amplitude signal light is entered into the EDF along the backward direction. Then, the variable attenuator is controlled by way of the ALC control manner in such a manner that the synthesized output of the EDF becomes constant, whereas this EDF is controlled by way of the AGC control operation. As a result, even when the transmission channel number is changed in the wavelength division multiplex transmission, the levels in the respective channels can be maintained at the constant level. Furthermore, also during the transition response time, there is an effect that no level variation occurs in the signal light of the channels through which the signal light is continuously transmitted.

To compensate the signal level when the total channel number is changed, the optical amplifying apparatus employs such an arrangement that a portion of the amplified signal light is entered to the EDF along the backward direction. As a result, since the wavelength except for such a channel originally required in the optical transmission needs not to be employed, there is another merit that all of the wavelength bands which can be amplified can be applied to the optical transmission channels. To compensate the level change in the existing channel, a new light source is not required. There is another merit that such an optical component having a wavelength selective characteristic as a wavelength division multiplexer, an optical branching device, and fiber grating is no longer required.

Moreover, since the gain control of the EDF is carried out in the AGC control manner, even when the total number of operation channels is changed from 0 channel to 1 channel, or more, there is a further effect that the optical surge is not produced.

While this invention has been described in connection with certain preferred embodiments, it is to be understood that the subject matter encompassed by way of this invention is not to be limited to those specific embodiments. On the contrary, it is intended for the subject matter of the invention to include all alternative modification and equivalents as can be included within the spirit and scope of the following claims.

What is claimed is:

1. An optical amplifying apparatus for transmitting wavelength division multiplexed signal light, comprising:
    an input terminal into which signal light is entered and said input signal light is made from single signal light, or signal light, the plural different wavelengths of which are division-multiplexed, is entered;
    an amplifying optical fiber;
    a pumping light source for outputting pumping light;
    a wavelength division multiplexer for causing said pumping light to be entered into said amplifying optical fiber, whereby said signal light is optically amplified to output amplified signal light from said optical amplifying apparatus;
    an amplified signal light reentering unit for branching a portion of said amplified signal light and for reentering the branched/amplified signal light into said amplifying optical fiber from an output side thereof along a backward direction;
    a branched/amplified signal light level control circuit for controlling the level of said branched/amplified signal light in such a manner that a total output level becomes a predetermined value, and said total output level is obtained by adding an output level of said amplified signal light to an output level of said branched/amplified signal light which has been reentered into the amplifying optical fiber to be optically amplified;
    an amplifying optical fiber input power detecting circuit for detecting an input level of said signal light and an input level of said branched/amplified signal light before being reentered into said amplifying optical fiber to thereby output an amplifying optical fiber input level;
    an amplifying optical fiber output power detecting circuit for detecting an output level of said amplified signal light and an output level of said branched/amplified signal light after being reentered into said amplifying optical fiber to be optically amplified; and
    a gain control circuit for controlling a gain based upon said amplifying optical fiber input level and said amplifying optical fiber output level in such a manner that said gain is maintained at a preselected value.

2. An optical amplifying apparatus for transmitting wavelength division multiplexed signal light as claimed in claim 1 wherein:
    said gain control means includes first injection current control means for controlling an injection current injected into said first pumping light source.

3. An optical amplifying apparatus for transmitting wavelength division multiplexed signal light as claimed in claim 1 wherein:
    said amplified signal light reentering means includes:
        a first optical branching device for branching a portion of said amplified signal light to output said branched/amplified signal light;
        a variable attenuator for controlling an attenuation amount of said branched/amplified signal light by receiving an attenuation amount control signal; and
        a reflector for reflecting said branched/amplified signal light which passes through said variable attenuator.

4. An optical amplifying apparatus for transmitting wavelength division multiplexed signal light as claimed in claim 1 wherein:
    said amplified signal light reentering means includes:
        a first optical branching device for branching a portion of said amplified signal light to output said branched/amplified signal light; and
        a variable reflector for controlling reflectivity of said branched/amplified signal light by receiving an attenuation amount control signal so as to reflect said branched/amplified signal light.

5. An optical amplifying apparatus for transmitting wavelength division multiplexed signal light as claimed in claim 1 wherein:
    said amplified signal light reentering means includes:
        a first optical branching device for setting a branching ratio used to branch a portion of said amplified signal light by receiving an attenuation amount control signal to output said branched/amplified signal light; and
        a reflector for reflecting said branched/amplified signal light.

6. An optical amplifying apparatus for transmitting wavelength division multiplexed signal light as claimed in claim 1 wherein:
    said amplified signal light reentering means includes:
        a first optical branching device for branching a portion of said amplified signal light to output said branched/amplified signal light;
        a variable attenuator for entering thereinto said one portion of branched/amplified signal light and for controlling an attenuation amount of said branched/amplified signal light by receiving an attenuation amount control signal; and a first optical circulator arranged on the output side of said amplifying optical fiber, for entering said branched/amplified signal light which passes through said variable attenuator into said amplifying optical fiber and also for outputting saidamplified signal light to a transmission path.

7. An optical amplifying apparatus for transmitting wavelength division multiplexed signal light as claimed in claim 1 wherein:

said branched/amplified signal light level control means includes:

an attenuation amount control circuit for sending out said attenuation amount control signal in such a manner that a synthesized output level is made equal to a predetermined value, and said synthesized output level is produced by synthesizing an output level of said amplified signal light with an output level of said branched/amplified signal light after being reentered into said amplifying optical fiber so as to be optically amplified.

8. An optical amplifying apparatus for transmitting wavelength division multiplexed signal light as claimed in claim 1 wherein:

said amplifying optical fiber input power detecting means includes:

a second optical branching device arranged on the input side of said amplifying optical fiber, for branching a portion of said signal light;

a third optical branching device arranged between the output side of said amplifying optical fiber and said amplified signal light reentering means, for branching a portion of said branched/amplified signal light which is traveled toward said amplifying optical fiber; and a first optical coupler for coupling the signal light branched by said second optical branching device to the signal light branched by said third optical branching device.

9. An optical amplifying apparatus for transmitting wavelength division multiplexed signal light as claimed in claim 8 wherein:

said amplifying optical fiber input power detecting means includes:

a fourth optical branching device arranged on the output side of said amplifying optical fiber, for branching a portion of said amplified signal light;

a fifth optical branching device arranged on the input side of said amplifying optical fiber, for branching a portion of said branched/amplified signal light which is reentered into said amplifying optical fiber and is optically amplified; and a second optical coupler for coupling the signal light branched by said fourth optical branching device to the signal light branched by said fifth optical branching device.

10. An optical amplifying apparatus for transmitting wavelength division multiplexed signal light as claimed in claim 8 wherein:

said amplifying optical fiber output power detecting means includes:

a fourth optical branching device arranged on the output side of said amplifying optical fiber, for branching a portion of said amplified signal light;

a second optical circulator arranged on the input side of said amplifying optical fiber, for outputting said signal light to said amplifying optical fiber and also for outputting said branched/amplified signal light outputted from said amplifying optical fiber to said second optical coupler; and a second optical coupler for coupling the signal light branched by said fourth optical branching device to the signal light branched by said fifth optical branching device.

11. An optical amplifying apparatus for transmitting wavelength division multiplexed signal light as claimed in claim 9 wherein:

assuming now that a level of said signal light inputted into said amplifying optical fiber is $P_{in1}$; a level of said amplified signal light outputted from said amplified optical fiber is $P_{out1}$; a level of said branched/amplified signal light entered into said amplified optical fiber is $P_{in2}$; and a level of said branched/amplified signal light outputted from said amplifying optical fiber is $P_{out2}$, the level $P_{in1}$ of said signal light branched by said second optical branching device; the level $P_{in2}$ of said branched/amplified signal light branched by said third optical branching device; the level $P_{out1}$ of said amplified signal light branched by said fourth optical branching device; and the level $P_{out2}$ of said branched/amplified signal light branched by said fifth optical branching device each satisfy the following condition:
$P_{in1}:P_{in2}:P_{out1}:P_{out2}=P_{in1mon}:P_{in2mon}:P_{out1mon}:P_{out2mon}$.

12. An optical amplifying apparatus for transmitting wavelength division multiplexed signal light as claimed in claim 1, further comprising:

a first optical isolator arranged at a pre-stage of said amplifying optical fiber, for causing such signal light to pass therethrough only along a travel direction of the signal light and for blocking such signal light traveled along a direction opposite to said travel direction; and a second optical isolator arranged at a post-stage of said amplifying optical fiber output power detecting means, for causing such signal light to pass therethrough only along a travel direction of said signal light and for blocking such signal light traveled along a direction opposite to said travel direction.

13. An optical amplifying apparatus for transmitting wavelength division multiplexed signal light as claimed in claim 1 wherein:

said first wavelength division multiplexer is arranged at a pre-stage of said amplifying optical fiber.

14. An optical amplifying apparatus for transmitting wavelength division multiplexed signal light as claimed in claim 1 wherein:

said first wavelength division multiplexer is arranged at a post-stage of said amplifying optical fiber.

15. An optical amplifying apparatus for transmitting wavelength division multiplexed signal light as claimed in claim 1 wherein:

said first wavelength division multiplexer is arranged between said third optical branching device and said second optical branching device.

16. An optical amplifying apparatus for transmitting wavelength division multiplexed signal light as claimed in claim 1 wherein:

a third optical circulator is arranged at a pre-stage of said amplifying optical fiber, and said third optical circulator outputs said amplified signal light to the transmission path, and also said pumping light outputted from said wavelength division multiplexer to said amplifying optical fiber.

17. An optical amplifying apparatus for transmitting wavelength division multiplexed signal light as claimed in claim 13, further comprising:
- a second pumping light source for outputting second pumping light; and
- a second wavelength division multiplexer arranged at a post-stage of said amplifying optical fiber, for entering said second pumping light into said amplifying optical fiber; wherein:
  said gain control means further includes:
  second injection current control means for controlling an injection current injected to said second pumping light source.

18. An optical amplifying apparatus for transmitting wavelength division multiplexed signal light as claimed in claim 13, further comprising:
- a second pumping light source for outputting second pumping light; and
- a second wavelength division multiplexer arranged between said third optical branching device and said second optical coupler, for entering said second pumping light into said amplifying optical fiber; wherein:
  said gain control means further includes:
  second injection current control means for controlling an injection current injected to said second pumping light source.

19. An optical amplifying apparatus for transmitting wavelength division multiplexed signal light as claimed in claim 13, further comprising:
- a second pumping light source for outputting second pumping light; and
- a third optical circulator for outputting said amplified signal light to the transmission path, and also for outputting said pumping light outputted from said wavelength division multiplexer to said amplifying optical fiber; wherein:
  said gain control means further includes:
  second injection current control means for controlling an injection current injected to said second pumping light source.

20. An optical amplifying apparatus for transmitting wavelength division multiplexed signal light, comprising:
- an input terminal into which signal light is entered and said input signal light is made from single signal light, or signal light, the plural different wavelengths of which are division-multiplexed, is entered;
- an amplifying optical fiber;
- a pumping light source for outputting pumping light;
- a wavelength division multiplexer for causing said pumping light to be entered into said amplifying optical fiber, whereby said signal light is optically amplified to output amplified signal light from said optical amplifying apparatus;
- a forward direction input level detecting circuit for detecting an input level of signal light which is propagated through said amplifying optical fiber along the same direction as that of said signal light;
- a forward direction output level detecting circuit for detecting an output level of signal light which is propagated through said amplifying optical fiber along the same direction as that of said signal light and then is amplified;
- a backward direction input level detecting circuit for detecting an input level of signal light which is propagated through said amplifying optical fiber along the opposite direction to that of said signal light;
- a backward direction output level detecting circuit for detecting an output level of signal light which is propagated through said amplifying optical fiber along the opposite direction to that of said signal light and then is amplified; and
- a gain control circuit for controlling a gain of said amplifying optical fiber based upon said signal light input level of the forward direction, said signal light input level of said backward direction, said signal light output level of the forward direction, and said signal light output level of the backward direction in such a manner that the gain is maintained at a preselected value.

21. An optical network apparatus comprising:
- a plurality of optical transmitters for outputting signal light having different wavelengths from each other;
- wavelength division multiplexing means for wavelength-division-multiplexing each of said signal light to output wavelength-division-multiplexed signal light;
- light inserting/extracting means for selecting a wavelength from said wavelength-division-multiplexed light to thereby extract specific signal light and also for inserting signal light; and
- the optical amplifying apparatus for transmitting wavelength division multiplexed signal light, as recited in claim 1.

22. An optical network apparatus comprising:
- a plurality of optical transmitters for outputting signal light having different wavelengths from each other;
- wavelength division multiplexing means for wavelength-division-multiplexing each of said signal light to output wavelength-division-multiplexed signal light;
- light inserting/extracting means for selecting a wavelength from said wavelength-division-multiplexed light to thereby extract specific signal light and also for inserting signal light; and
- the optical amplifying apparatus for transmitting wavelength division multiplexed signal light, as recited in claim 20.

* * * * *